United States Patent [19]

Damlamian

[11] 3,913,135

[45] Oct. 14, 1975

[54] ANALOG AND DIGITAL TAPE RECORDER INCORPORATING LEGEND DISPLAYING MEANS

[76] Inventor: Jean J. Damlamian, 4, rue Lazare Carnot, 92140 Clamart, France

[22] Filed: Dec. 26, 1973

[21] Appl. No.: 427,484

[30] Foreign Application Priority Data

Dec. 26, 1972 France ............................ 72.46239

[52] U.S. Cl. ...................................... 360/79; 360/18

[51] Int. Cl.$^2$ ........................................ G11B 31/00

[58] Field of Search ............ 360/48, 49, 50, 72, 79, 360/27, 39, 4, 18

[56] References Cited

UNITED STATES PATENTS

| | | | |
|---|---|---|---|
| 3,623,039 | 11/1971 | Barham | 360/48 |
| 3,792,442 | 2/1974 | Koeijmans | 360/49 |

*Primary Examiner*—Vincent P. Canney
*Attorney, Agent, or Firm*—Abraham A. Saffitz

[57] ABSTRACT

Tape recorder for recording and reading out analog signals representative of speech or music and digital signals representative of alphanumerical characters forming legends relative to said speech or music. The tape recorder comprises means for displaying the alphanumerical characters of the legends whichever may be the direction and the speed of the movement of the magnetic tape.

2 Claims, 6 Drawing Figures

ANALOG AND DIGITAL TAPE RECORDER INCORPORATING LEGEND DISPLAYING MEANS

The present invention relates to a tape recorder for the recording and playback of analog and digital signals and more particularly a tape recorder for writing-in and reading-out numerical legends inserted into an analog signal and which may be regarded as the titles of subsequent analog passages, of visualizing these legends in the form of alphanumerical characters and of re-initialling the tape at the beginning of such a numerical legend.

As an example of the use of such a tape recorder, it will be assumed that the magnetic tape contains a musical concerto and that the digital legends recorded at intervals during the concerto comprise at the start:

— the name of the composer, the title of the work "Concerto for (instrument) and orchestra" in D major or . . . , opus No. N, the name of the soloist: Y, the name of the orchestra: Z, the name of the orchestral conductor: T, first movement "Allegro non troppo" or . . . and, later on in the tape:

— second movement: adagio or . . . ,

— third movement: Allegro ciocoso ma non troppo vivace, or . . . etc. . . .

The magnetic tape may also contain for example a scientific course, the mathematical, chemical, etc., formulae of which should be represented visually.

With such a tape recorder, it is necessary to distinguish the analog passages from the digital passages in order to be able to re-initial the tape at the beginning of an analog passage chosen by the operator and, as the tape can be either wound forwardly at constant speed by the capstan, or wound back or wound on by the feed spools and take-up spools themselves, but at a variable speed, this distinguishing or discrimination should be done at variable speed and in both directions of movement of the tape.

According to the present invention, there is provided a tape recorder comprising means for recording and reading-out analog signals and digital signals representing alphanumerical characters, means for displaying the alphanumerical characters and means for synchronizing the display means with the speed of reading-out of the digital signals.

Figure 1:
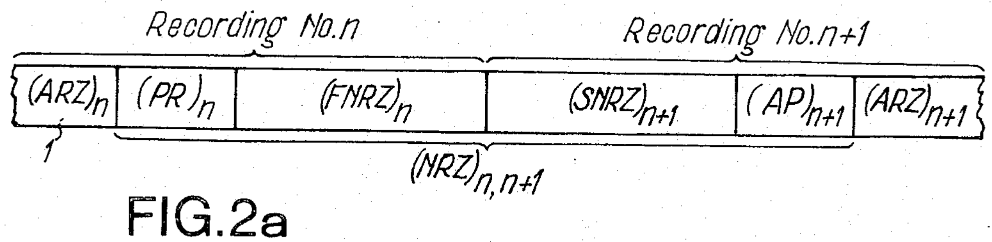
Figure 2A:
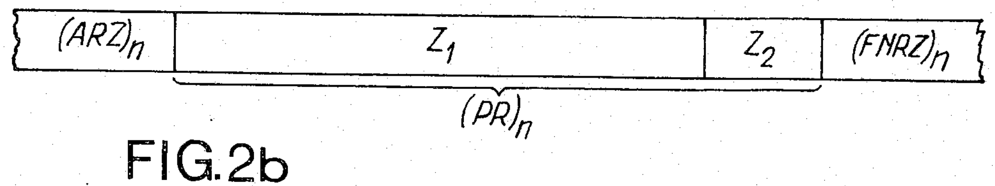
Figure 2B:
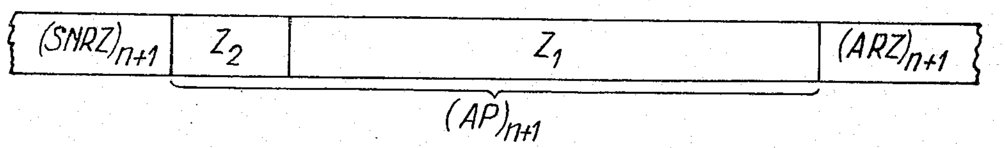
Figure 4:
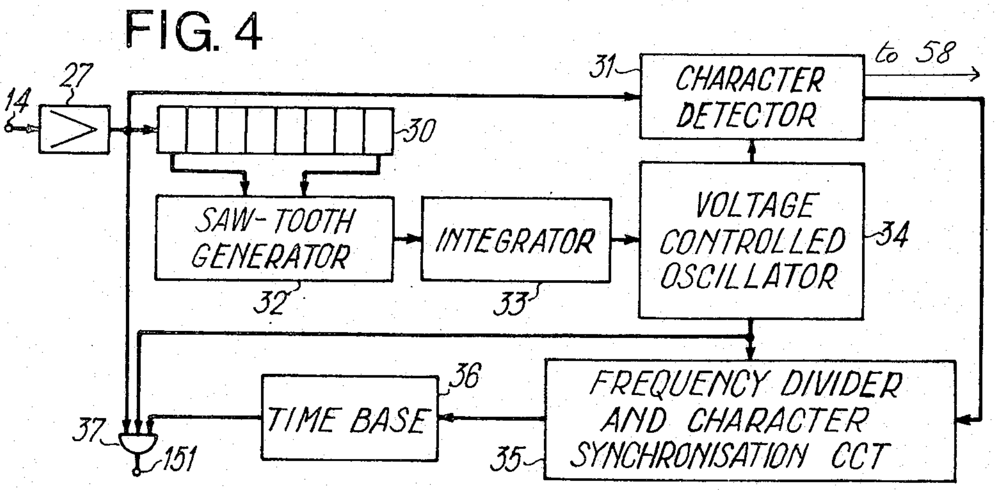
Figure 5:
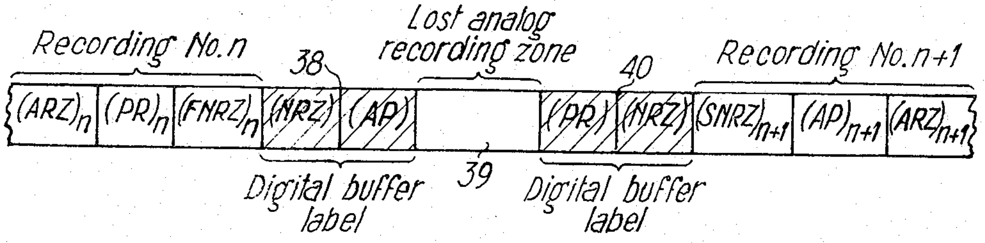
Figure 3:
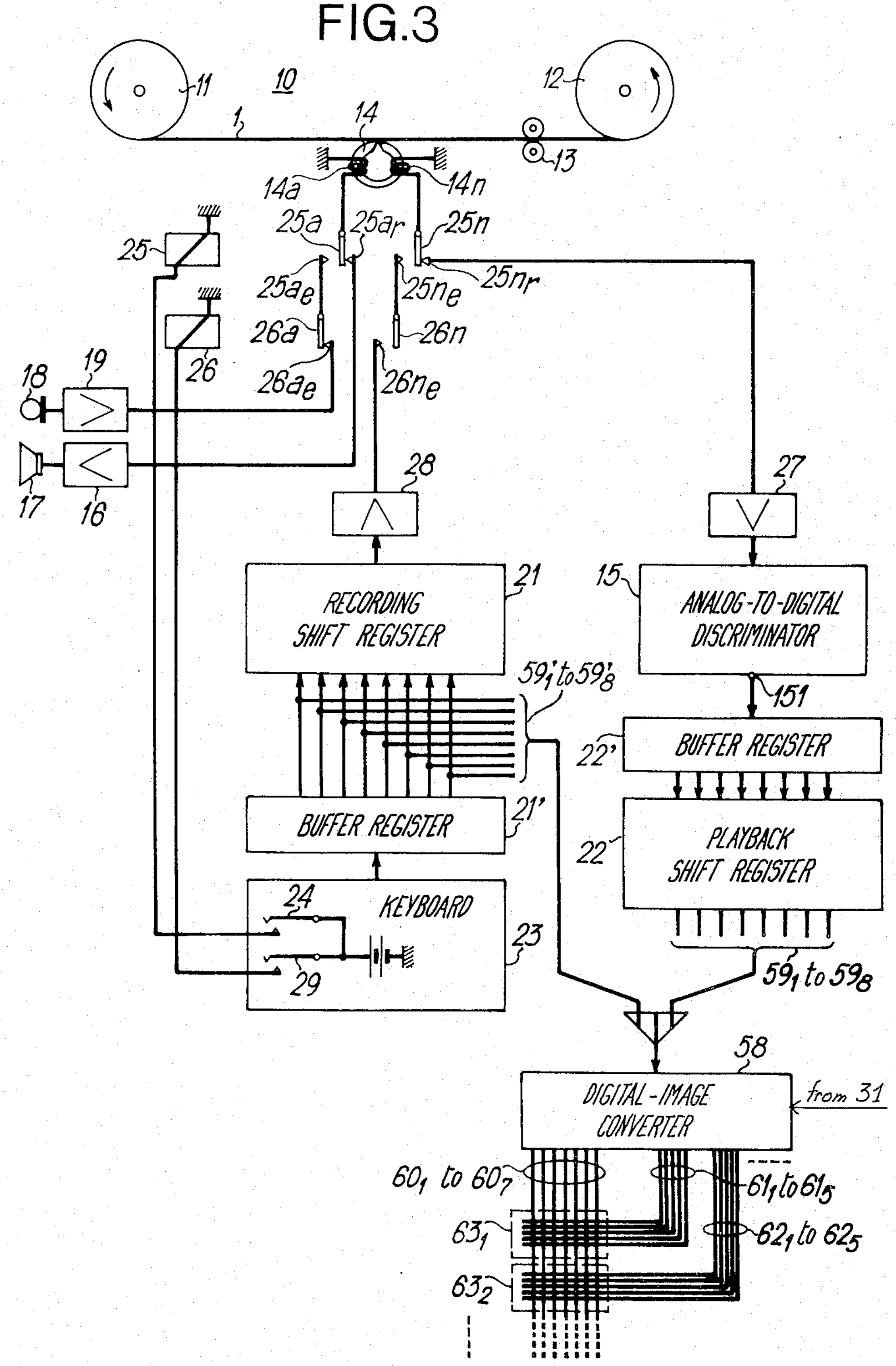

The invention will now be described in more detail, by way of example only, with reference to the accompanying drawings, in which:

FIGS. 1, 2*a* and 2*b* schematically show the succession on the tape of the various types of signals recorded thereon;

FIG. 3 diagrammatically shows the arrangement of the elements of the tape recorder of the invention, i.e., of the recording and reading-out head and of the means associated therewith for discriminating the digital signals from the analog signals and selectively directing them for acoustical reproducing or for visual display;

FIG. 4 shows in greater detail the analog-digital discriminator circuit of FIG. 3; and, FIG. 5 shows the analog and digital contents of a magnetic tape which can be used as a variant on the tape recorder enable an amateur to make separate recordings.

Referring to FIG. 1, the reference numeral 1 shows a magnetic tape in which (ARZ) designates an analog recording zone and (NRZ) denotes a digital recording zone. Each digital recording zone (NRZ) comprises a heading preamble (PR), a final digital recording zone (FNRZ), a start digital recording zone (SNRZ) and an appendix (AP). There is shown in FIG. 1 a record of serial number *n* comprising the zone of analog recording $(ARZ)_n$, the preamble $(PR)_n$ and the final digital recording zone $(FNRZ)_n$ and a record of serial number $(n+1)$ comprising the start digital recording zone $(SNRZ)_{n+1}$, the appendix $(AP)_{n+1}$ and the analog recording zone $(ARZ)_{n+1}$.

The preamble portion (PR) and the appendix portion (AP) serve to synchronize the bits and the characters. Each of them comprises a zone $Z_1$ for synchronizing the bits and a zone $Z_2$ for synchronizing the characters in the order $Z_1$, $Z_2$ as regards the head preamble portion and in the order $Z_2$, $Z_1$ as regards the appendix portion. The zone $Z_1$ contains 150 one bits and the zone $Z_2$ contains 6 particular octets, i.e. a total for a preamble or an appendix:

$$150 + 6 \times 8 = 198 \text{ bits}$$

The numerical recording is made by conventional phase modulation technique, which has to be modified in the case of the preamble and appendix as will be apparent hereinafter. In the case of an apparatus constructed by the Applicant, the starting and final digital recording zones comprise 100 octets which are doubled for reasons of reliability. The result of this is that a digital recording zone comprises:

| | | |
|---|---|---|
| a head preamble (PR) | | 198 bits |
| a final digital recording zone (FNRZ) | 200 × 8 = | 1600 " |
| a start digital recording zone (SNRZ) | 200 × 8 = | 1600 " |
| an appendix (AP) | | 198 " |
| | Total | 3600 bits |

Assuming a permissible recording density of 100 bits per centimeter, a digital recording zone occupies 36 cm, which at a tape speed of 9 cm per second takes 4 seconds.

Referring now to FIG. 3, this shows a tape recorder 10 the feed spool of which is designated as 11 and the take-up spool as 12, the capstan as 13 and the record-read out head as 14.

The head 14 has two windings 14*a* and 14*n*, both read or scan simultaneously the analog and digital signals, whilst each winding only enters or records one type of signal. When the "record-playback" relay 25 is in the record position (relay excited) the analog winding 14*a* is connected to a microphone 18 and the digital winding 14*n* is connected to a digital signal source as will be seen. The relay 26 which is an "analog-digital" relay working in the recording mode only operates to prevent the two windings 14*a* and 14*n* of being fed simultaneously.

In more detail, the analog winding 14*a* is connected to the microphone 18 through the switch 25*a* of the record-playback relay 25 in its position 25*ae*, the switch 26*a* of the analog-digital relay 26 for recording only in its position 26*ae* and the recording amplifier 19. The loudspeaker 17 is connected to the analog winding 14*a* via the playback amplifier 16 and the switch 25*a* of the record-playback relay 25 in the position 25*ar*. It will be seen that the loudspeaker 17 receives both analog and digital signals, which presents no drawback.

The reference numerals 21 and 22 designate respectively a recording shift-register receiving the coded characters from a keyboard 23 via a buffer register 21′ and a playback shift register receiving the coded characters from the output 151 of an analog-digital discriminator 15 via a buffer register 22′. The shift registers 21 and 22 act as parallel-series and series-parallel converters respectively. The parallel inputs of the recording register 21 are connected to the outputs of the buffer register 21′ and the parallel outputs of the buffer register 22′ are connected to the inputs of the playback register 22. The series output of the recording shift register 21 is connected to the head 14*n* via the amplifier 28, the switch 26*n* of the relay 26 in its position 26*ne* and the switch 25*n* of the relay 25 in its position 25*ne*. The analog-digital discriminator 15 is connected to the winding 14*n* via the switch 25*n* of the relay 25 in its position 25*nr* and the amplifier 27.

The keyboard 23, which may be a teleprinter keyboard, for example, is connected in parallel to the buffer register 21′ and issues instructions for the feeding into this register of codes of alphanumerical characters the buttons of which have been pressed. The button 24 record-playback controls the relay 25 and the button 29 analog-digital (for recording only) controls the relay 26. Phase modulation recording and playback amplifiers 27 and 28 respectively are inserted as it has just been seen, in series in the channels to the recording and playback windings of the head 14. These amplifiers are of a conventional type known in the art and are described, for example, in the work "Magnetic Recording in Science and Industry", published by C.B. Pear Jr., New York, page 155, FIG. 5.9, as concerns write-in amplifier 28 and FIG. 5.10 as concerns read-back amplifier 27.

The parallel outputs of the buffer register 21′ and of the playback register 22 are connected to a "digital-image" converter or character generator 58 converting the binary characters of eight bits into standard dot matrix characters of seven lines and five columns, commonly called 5×7 dot matrix characters. As is known, these 5×7 dot matrix characters are represented by five words of seven bits or seven words of five bits. Such code converters are known in the art under the name of read-out store memories or ROM. They distribute five words each of seven bits when they receive as address one word having a predetermined number of bits. A converter of this type is described for example in the article "There's a better way to design a character generator" by Gene CARTER and Dale MRAZEK which has appeared in the review "Electronics" of Apr. 27, 1970, on pages 107–112. Another dot matrix character generator is described in the article "A Logic Character Generator for Use in a CRT Text Display" by P. A. V. Thomas and W. E. Mennie in "Information Display", Volume 9, Number 2, March/April 1972, pages 9–14. This reference shows in line *c* of FIG. 3 the five words produced by the character generator for displaying the letter A in dot matrix representation. If the seven dots of the first column are numbered from 1 to 7, the seven dots of the second column from 8 to 14 and the seven dots of the fifth column from 29 to 35 as shown in FIG. 1 of the reference, these five words are:

1111100; 0010010; 0010001; 0010010; 1111100.

Converter 58 receives address words of eight bits by way of the leads $59_1$ to $59_8$ or $59_1'$ to $59_8'$ and selectively energizes a first group of seven wires $60_1$ to $60_7$ and as many groups of five wires $61_1$ to $61_5$, $62_1$ to $62_5$, . . . as there are alphanumerical characters to be visualized. These characters $63_1$, $63_2$, . . . are for example liquid crystal characters. Liquid crystal display panels are described in the article "Liquid Crystal Display Devices" by George H. HEILMEIR which appeared in the American periodical "Scientific American", April 1972, pages 100–106. The liquid crystals are of the memory type, such as are described on page 103 of this article. The liquid crystalline material assumes a milky white appearance in places where it is subjected to the influence of a D.C. field and remains in this condition when the field is cut off. The material rapidly becomes transparent again if it is subjected to an alternating field of sufficient amplitude and having a frequency of the order of 4 kHz.

When the converter 58 receives a word of address of eight bits, it emits in succession five words of seven bits through the wires $60_1$ to $60_7$ and during the emission of the first word, it raises the wire $61_1$ only to a predetermined potential, then during the emission of the second word raises the wire $61_2$ to this same potential and so on. In the case where letter A is displayed, wire $61_1$ is activated when the first above-mentioned seven bit word is transmitted, then wire $61_2$ is activated when the second above-mentioned seven bit word is transmitted and so on.

The analog-digital discriminator 15 (FIG. 3) described with reference to FIG. 4 enables the synchronization of the logical portion of the apparatus to be effected.

The signals coming from the head 14n and amplified by the amplifier 27 are applied on the one hand to a counter 30 with eight flipflops and on the other hand to a character detector 31. During the reading-out of the digital preamble and appendix (PR and AP), the one bits of the bit synchronizing zone $Z_1$ are counted by counter 30. The saw-tooth generator 32 is triggered by the first flipflop of counter 30 and is stopped by the eighth flipflop of this counter and the resulting saw-tooth signals are integrated with respect to time by integrator 33. The voltage control pulse generator 34 (VCO) which receives a signal whose amplitude is proportional to the bit period can thus be synchronized on the bit frequency which is applied to the synchronization character detector 31. The character detector 31 provides an output signal each time that it receives the predetermined character one sequence of which constitutes the zone $Z_2$ of the tape.

The output of the pulse generator 34 is connected to an eight-fold frequency divider which also constitutes a character synchronizing circuit 35. For this purpose the circuit 35 receives the output pulses from the character detector 31. Circuit 35 behaves as a pulse code modulation system frame synchronizing circuit, the frame locking signal being the sequence of predetermined characters in zone $Z_2$. Frame synchronization circuits are well known in the field of pulse code modulation systems and therefore need not be further described in the present specification.

Clock pulses appear at the output of the generator 34 and the character pulses appear at the output of the circuit 35, and are transmitted to the registers and to the digital-image converter.

The output pulses from the eightfold frequency divider 35 are applied to a counter forming part of a time base 36. This time base controls the AND-gate 37 connected to the output terminal 151 during the periods of reading-out from the final digital recording zone and from the appendix when the tape is wound backwards and during the periods of reading-out of the start digital recording zone and of the preamble when the tape is run forwards. The AND-gate 37 is only kept open during the reading-out of the 400 useful octets of the final digital recording zone and of the start digital recording zone owing to the action of the counter of the time base 36. This AND-gate 37 therefore only allows the passage of information during the time intervals corresponding to the reading-out of the characters (FNRZ) or (SNRZ) shown in FIG. 1. In fact, during the reading-out of the zones ARZ of analog recording, there is a slight possibility that the integrator circuit 33 will be influenced by a periodic signal of sufficiently stable frequency enabling the voltage controlled pulse generator 34 to synchronize on to this frequency. However, if such be the case, it is very unlikely that the character detector device 31 should then recognize the special configuration of the synchronizing character in the analog information. Consequently, inhibition of the possibility of the simultaneous functioning in the playback mode of the analog circuits (14*a*, 25*a*, 25*ar*) and the digital circuits (14*n*, 25*n*, 25*nr*, 27,15) of FIG. 3 does not call for any additional precautions.

It should be added that during fast forward running or rearwardly winding of the tape the tape recorder functions in the playback mode, the loudspeaker 17 being automatically disconnected by the rapid forward running or rewinding instructions.

In FIG. 5, the two digital buffer labels the first of which comprises the preamble (PR) and the final digital recording zone (FNRZ) and the second of which comprises the start digital recording zone (SNRZ) and the appendix (AP) instead of being juxtaposed are spaced apart with respect to each other. The backwards digital buffer label is written at the end of record No. *n*, then the tape recorder is stopped and the forwards digital buffer label 38 is not recorded closely thereto. When record No. (*n*+1) is started, a forwards digital buffer label is directly recorded with no backwards digital buffer label 40 preceding it. The portions 38, 39 and 40 are lost portions of the magnetic tape.

The operation of the magnetic recorder is the following:

When the tape runs in the direction going from the right hand to the left hand, said direction being assumed to be the normal playback direction, at the end of record No. *n*, the analog-digital discriminator is synchronized by the preamble $(PR)_n$ and a particular octet of this preamble activates the digital-image converter with a predetermined delay. When the start digital recording zone $(SNRZ)_{n+1}$ is read-out, the legends relative to the record being played back are displayed until the end of this record at which time a particular octet comprised in the preamble $(PR)_{n+1}$ resets the digital-image converter. The characters in the final digital recording zone $(FNRZ)_n$ which are recorded in the direction opposite to the tape running direction are not displayed, due to the fact that the activation of digital-image converter 58 is delayed.

When the tape runs in the direction going from the left hand to the right hand which corresponds to the reeling back of the tape, at the end of record No. *n*, the analog-digital discriminator is synchronized by the appendix $(AP)_{n+1}$ and a particular octet of this appendix activates the digital-image converter with a predetermined delay. When the final digital recording zone $(FNRZ)_n$ is read-out, the legends relative to the record being reeled back are displayed until the beginning of this record at which time a particular octet comprised in the appendix $(AP)_n$ resets the digital-image converter. The characters in the start digital recording zone $(SNRZ)_{n+1}$ which are recorded in the normal running direction are not displayed due to the fact that the activation of the digital-image converter 58 is delayed.

The tables of data display or visualisation of the alpha-numerical characters may be of other known types different from the liquid crystal type. Digitally controlled data display tables are for example described in the article "Computer Generated Displays" by R. T. LOEWE, R. L. SESSON and P. HOROWITZ which appeared in the American periodical "Proceedings of the IRE", January 1961, pages 185–195 (see especially the bibliography at the end of the article). Morover, systems of bit synchronization and of characters synchronization different from that of FIG. 4 are known in the art and can be employed instead of that which has been described.

I claim:

1. A tape recorder comprising means for recording on a movable magnetic tape analog signals, digital signals representing alpha-numerical characters associated with said analog signals, synchronizing signals and display control signals, means for reading-out said analog signals, digital signals, synchronizing signals and display control signals from said magnetic tape, means for displaying said alpha-numerical characters, means for activating said displaying means controlled by said display control signal reading-out means and means for synchronizing said displaying means controlled by said synchronizing signal read-out means.

2. A tape recorder comprising means for recording on a movable magnetic tape analog signals, digital signals representing alpha-numerical characters associated with said analog signals, synchronizing signals and display control signals, means for reading-out said analog signals, digital signals, synchronizing signals and display control signals from said magnetic tape, said digital signals comprising forward digital signals recorded on the tape in the forwards direction movement thereof and backwards digital signals recorded on the tape in the backwards direction movement thereof, means for selectively displaying said alpha-numerical characters controlled by said means for reading-out said forwards and backwards digital signals, means for activating said selective displaying means controlled by said display control signal read-out means, and means for synchronizing said selective displaying means controlled by said synchronizing signal read-out means.

* * * * *